United States Patent [19]

Coffin et al.

[11] Patent Number: 5,646,206

[45] Date of Patent: Jul. 8, 1997

[54] FILMS FABRICATED FROM MIXTURES OF PECTIN AND POLY(VINYL ALCHOHOL)

[75] Inventors: David R. Coffin, Glenside; Marshall L. Fishman, Lansdale, both of Pa.

[73] Assignee: The United States of America as represented by the Secretary of Agriculture, Washington, D.C.

[21] Appl. No.: 529,299

[22] Filed: Sep. 18, 1995

Related U.S. Application Data

[63] Continuation-in-part of Ser. No. 51,415, Apr. 23, 1993, Pat. No. 5,451,673.

[51] Int. Cl.$^6$ ....................................... C08L 5/00
[52] U.S. Cl. ................................ 524/27; 524/55
[58] Field of Search ........................... 524/27, 55

[56] References Cited

U.S. PATENT DOCUMENTS

| | | | |
|---|---|---|---|
| 3,962,414 | 6/1976 | Michaels | 424/19 |
| 4,505,976 | 3/1985 | Doehnert et al. | 428/355 |
| 5,206,026 | 4/1993 | Sharik | 424/445 |
| 5,272,191 | 12/1993 | Ibrahim et al. | 524/35 |
| 5,308,647 | 5/1994 | Lappi | 427/154 |
| 5,451,673 | 9/1995 | Fishman et al. | 530/123 |

FOREIGN PATENT DOCUMENTS 0419396  4/1990  European Pat. Off. .

OTHER PUBLICATIONS

Nitikin "The Chemistry of Cellulose and Wood", S. Monson publisher, 1966, pp. 62–71.

*Primary Examiner*—Nathan M. Nutter
*Attorney, Agent, or Firm*—M. Howard Silverstein; John Fado; Janelle S. Graeter

[57] ABSTRACT

High modulus, flexible films may be fabricated from blend of pectin, poly(vinyl alcohol) and, optionally, plasticizers. The combination of pectin and poly(vinyl alcohol) is advantageous in that pectin increases the biodegradability of poly(vinyl alcohol). In addition, the use of pectin provides effective utilization of an agricultural product.

10 Claims, 8 Drawing Sheets

FILMS FABRICATED FROM MIXTURES OF PECTIN AND POLY(VINYL ALCHOHOL)

This application is a continuation-in-part of application Ser. No. 08/051,415, filed Apr. 23, 1993 and now U.S. Pat. No. 5,451,673 herein incorporated by reference.

BACKGROUND OF THE INVENTION

1. Field of the Invention

Films made from natural products are of increasing scientific and commercial interest. These films are not only biodegradable but may also be recyclable as well as acceptable for pharmaceutical applications. Multiple uses, ease of disposal and the replacement of petroleum-based raw materials with renewable agricultural products make these types of films excellent candidates for commercial development.

This invention relates to novel films fabricated from mixtures of pectin and poly(vinyl alcohol) (PVOH). Plasticizers may also be included in the mixtures in order to increase film flexibility. The films are high modulus, flexible and self-supporting and are advantageous in that an agricultural waste product, i.e. pectin, is utilized.

2. Description of the Prior Art

The film-forming properties of several water soluble polysaccharides have been studied. Films useful for coatings made from alginates and carrageenans were disclosed by Kester et al. *Food Technology*, vol. 12 (1), pp. 47–59, (1986). Paper coatings and similar applications of carboxylmethyl cellulose and other cellulose ethers have been investigated, and studies of chitin and chitosan films, including self-supporting films, have also been carried out (Averback, *Proceedings First International Conference*, pp. 199–209, 1979; Hosokawa et al., *Ind. Eng. Chem. Res.*, vol. 29, pp. 309–324, 1990; Wong et al., *UJNR Protein Panel*, 19th Meeting, San Diego, Calif., 1990).

A few studies were carried out on pectin films in the 1930's and 1940's (Henglein et al., *Chemisch Berichte*, vol. 69(B), pp. 309–324, 1936; Henglein et al., German Patent No. 0680396, 1939; Maclay et al., *Chemurugic Digest*, vol. 6 (22), pp. 326 –329, 1947; Schultz *J. Colloid Sci.*, vol. 3, pp. 53–62, et al., 1948; Schultz et al., *J. of Physical and Colloid Chem.*, vol. 53, pp. 1320–1330, 1949); however, these studies generally involved derivatized pectins used with divalent cations such as calcium. A more recent work discussed blends of pectins and carboxymethyl cellulose for use as cigarette papers (Hind et al., U.S. Pat. No. 4,129,134, 1978). U.S. Pat. No. 2,542,052 (issued to H.S. Owens and T.H. Schultz) describes films made from low methoxyl (less than 7.4% methoxyl) pectin cross-linked with polyvalent cations. No other polymeric component was used.

Poly(vinyl alcohol) has previously been reported as useful in formulations for producing films or matrices for the delivery of medicaments, such as to a wound site (Sharik, U.S. Pat. No. 5,206,026 issued Apr. 27, 1993) or to the eye (Michaels, U.S. Pat. No. 3,962,414 issued Jun. 8, 1976). PVOH, however, suffers from the disadvantage that it is not readily biodegradable.

Thus, although various types of films may be formed from a variety of film-forming substances, none exhibit the advantageous properties of high modulus, flexibility and biodegradability as do the novel films of the invention described herein.

SUMMARY OF THE INVENTION

It has been discovered that high modulus flexible films can be fabricated from blends of pectin having high molecular weight, large radius of gyration and high intrinsic viscosity at an ionic strength of 0.05 or greater and poly(vinyl alcohol). The films are formed in the absence of divalent cations such as calcium. In addition, plasticizers may optionally be included in the mixtures in order to increase film flexibility.

In accordance with this discovery, it is an object of the invention to provide novel films comprising a blend of pectin, poly(vinyl alcohol) and, optionally, plasticizer.

It is also an object of the invention to provide a method of making the novel films.

Other objects and advantages of the invention will become readily apparent from the following description.

DETAILED DESCRIPTION OF THE INVENTION

Figure 1:
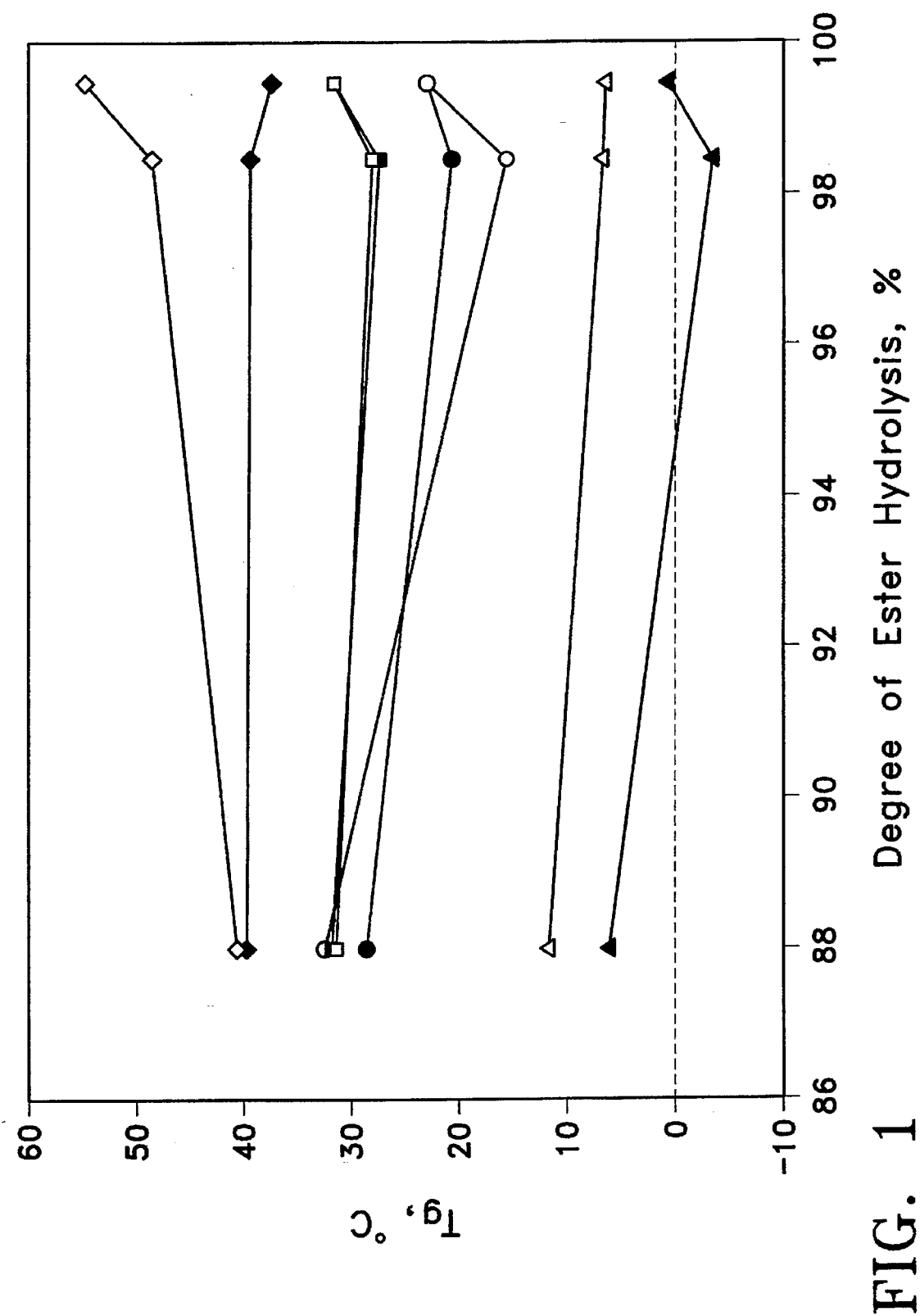
FIG. 1 shows the effect of degree of ester hydrolysis on glass transition temperature. Open symbols, 124,000–186,000 molecular weight; filled symbols, 50,000 mol. wt. %PVOH at ♦■ 10%, ▮ 30%, ● 50%, ▲ 100%.

Pectin is one of several film-forming water soluble polysaccharides and there are many agricultural sources of pectin which are currently under-utilized. There is potentially a large volume of raw material from which pectin can be obtained since it is a major component of fruits and vegetables and is therefore plentiful in agricultural wastes. Examples of sources from which pectin may be obtained are many kinds of fruits including stone fruits such as peaches, pome fruits such as apples, citrus fruits such as limes, lemons, oranges and grapefruit, vegetables such as sugar beets, cucumbers and squash and nuts such as almonds and sunflower seeds.

Pectins are a class of water soluble complex polysaccharides found in the cell walls of higher plants. The backbone consists predominantly of blocks of poly(galacturonic acid)

residues interrupted by short rhamnose inserts. The galacturonate residues are methyl esterified to varying extents, depending on the plant source. Neutral sugars are present in side chains attached to the backbone. These materials have found extensive use in processed foods as a result of their gelling properties.

Solution properties and shapes of various pectins were determined using high performance size exclusion chromatography, viscometry light scattering, membrane osmometry, nuclear magnetic resonance, electric birefringence, electron microscopy and infrared spectroscopy. Results showed that pectin is a collection of aggregated rigid rods or segmented rods which mat aggregate into a gel network. In solution, pectin may contain on average up to four chains per rod or segmented rod. The extended conformation of the molecule, as well as the presence of aggregation in solution, are properties similar to those found in some synthetic polymers, suggesting that pectin films would have desirable physical and mechanical properties.

In previous attempts to fabricate films from pectin, it was not recognized that high molecular weight alone was insufficient criteria to make useful films from pectin blends. In salt-free solutions, low molecular weight pectin fragments tended to form large molecular weight aggregates with low intrinsic viscosity. Low molecular weight, low methoxy fragments also aggregate in the presence of divalent cations, but these aggregates will not make useful films due to the occurrence of crosslinking which prevents flexibility. Furthermore, it was not recognized that water solubility was a desirable property of pectin films.

The particular pectin used is the most important factor in obtaining acceptable film properties. Unlike random coil polymers, pectin molecules are nearly fully extended both in solution and in the solid state. Therefore, extension of the material does not occur by uncoiling, but rather by slippage of the chains past each other and possibly by covalent bond stretching. This may lead to early fracture of the materials if there is little orientation present as a result of the casting method used. Molecular weight, intrinsic viscosity, radius of gyration and degree of methyl esterification of the pectin molecule contribute to a considerable degree to the effectiveness of the pectin. High molecular weight, large radium of gyration and high intrinsic viscosity at an ionic strength of 0.05 or greater will provide a useful, high modulus film. These particular properties can be determined by means well-known to those of skill in the art.

Preferred pectins may be obtained from citrus, especially lime or lemon. Weight average molecular weights of at least about 100,000 are useful; however, above about 150,000 is preferred. Particularly preferred is above about 200,000. A radius of gyration measurement of about 25 mm is acceptable for film-making purposes. The intrinsic viscosity at ionic strength of 0.05 or greater should measure at least about 2.1 dl/g, preferably as high as possible. The degree of methyl esterification should be at least about 50%, preferably about 70%, most preferably about 74%.

While pectin is biodegradable, PVOH, a synthetic polymer, is much less so, although it is susceptible to biodegradation. Both materials are water soluble, and a blend of the two increases the biodegradability of PVOH with comparable mechanical and solubility properties. Attempts have been made to increase PVOH biodegradability by either grafting starch onto it or blending it with starch, but these polymers have limited compatibility. Pectin and PVOH, however, have shown compatibility over the full range of compositions, and, as films, pectin/PVOH blends are more flexible than pectin alone and stronger than PVOH alone. Thus pectin/PVOH blends offer a range of strength and flexibility properties intermediate between pectin and PVOH. It is contemplated that these blends replace pure PVOH in applications where enhanced biodegradability is desirable.

PVOH is a strong tough material which can be easily obtained in a variety of molecular weights and is made by hydrolysis of poly(vinyl acetate). PVOH has good tensile strength and a high elongation to break, therefore it is a good candidate to blend with pectin to impart toughness to its films. The water solubility of the two polymers facilitates blending and processing of these polymers.

Plasticizers may also be added to the film mixture in order to increase the flexibility of the films. Many plasticizers are known in the art and have been used in other polymer systems. Acceptable plasticizers are glycerol, glycerine, urea and poly(alkylene glycols). Preferred are glycerol, glycerine and urea, while glycerol is particularly preferred. Selection of an appropriate plasticizer is made according to the ultimate required properties of the film.

Films made of mixtures of a thermoplastic synthetic polymer (PVOH) and a non-thermoplastic biopolymer (pectin), both of which exhibit biodegradability, have a variety of useful applications. They are useful as coatings, adhesives, water-soluble pouches for dispensing premeasured or hazardous substances, bags for washing linens of hospital patients with infectious diseases. Controlled release matrices, carriers or coatings which are water soluble also have numerous applications such as the application of pharmaceutical preparations to the skin. Biodegradable materials which are carrier matrices such as tablets or encapsulation materials are also contemplated.

The pectin-based polyblends of the invention can be made into films of varying thicknesses using conventional methods of solution casting and melt forming. Pectin is added to a solution of PVOH, cast on a plate using a film applicator and allowed to dry overnight. The films are then vacuum-dried, followed by removal from the coating plates.

Fibers may also be prepared from the blends described herein by wet spinning or dry spinning. Wet spinning involves extruding the blends under tension into a bath which is a coagulant for the components and which extracts the water from the coagulated fibers. Optionally, there may be an air gap between the spinneret face and the coagulating bath. Dry spinning involves extruding the blend under tension into a column of heated air to evaporate the water.

Films and fibers may also be prepared by a melt process, which involves mixing the components together with sufficient water to allow the pectin and PVOH to melt at a temperature below their decomposition temperatures. The blended material is fed to an extruder, extruded under tension through an appropriate die, cooled with air and taken up by an appropriate collection device. For making films, a tubular film can be made with cool air being blown through the center of the tube to both cool the film and to impart a biaxial stress to the film.

The extrusion process can also be used to make other shaped articles by using appropriate dies and molds.

In solution casting, pectin is dissolved in a solution of PVOH at room temperature. The rate of dissolution can be increased by heating at 40–60° C. The PVOH solution is prepared by dispersing the polymer in cold water and then heating the dispersion with vigorous agitation for thirty minutes. The temperature required increases with increasing degree of ester hydrolysis, and attaining the minimum temperature specified is essential for complete dissolution of the polymers. For example, heating at 96° C. is recommended for dissolving PVOH having degree of ester hydrolysis of 99+%. The solution is then cooled before adding pectin, since pectin degrades at the higher temperatures required for the dissolution of PVOH.

For the preparation of useful films, PVOH may be present in the pectin/PVOH blend in amounts ranging from about 10%(w/v) to about 90%(w/v). The preferred range is from about 20% (w/v) to about 80% (w/v). Plasticizer may be present in amounts up to about 30% (w/v). The amount of PVOH in the blend is dictated by the ultimate use of the film, and the amount of PVOH in the blend determines the glass transition temperature $T_g$ of the blend. The higher the amount of PVOH, the lower the $T_g$. Above the $T_g$, the composition is in a rubbery state, while below it is in a glassy state. Therefore, the state which is preferred at the particular temperature the film is to be used determines where the glass transition should occur. Typical films contain PVOH with molecular weights of about 10,000 to about 186,000, preferably about 10,000 to about 125,000 and degrees of hydrolysis from about 80% to about 100%. This point is easily determined by one of skill in the art, and an exemplary procedure is presented in the specific Examples. Plasticizer may be added to the blend in an amount effective for increasing the flexibility of the film amounts.

The effects of molecular weight and degree of ester hydrolysis on $T_g$ and ultimately on storage E' and loss E" moduli of films prepared from pectin and PVOH blends were tested, and it was found that the thermomechanical properties of pectin films are significantly changed by the addition of PVOH. Pectin does not have a glass transition below its decomposition temperature, which is in the range of 190–200° C., whereas PVOH has a $T_g$ in the vicinity of room temperature. In blends with pectin, PVOH imparts its $T_g$ to the blend. In the absence of the plasticizer glycerol, only one glass transition is found in the polymer blends.

Increasing the amount of PVOH in the blend results in the $T_g$ moving toward lower temperatures. The $T_g$ of the unplasticized pectin is higher than its decomposition temperature and therefore cannot be actually measured. In any true blend of two glassy polymers, the glass transition temperature of the mixture is intermediate between those of the two separate components, and typically the $T_g$ of the blend is somewhat depressed compared to the arithmetic average of the two individual $T_g$ values. The depression is due to a reciprocal dependence of $T_g$ on concentration. While depressed relative to the arithmetic average of the two glass transition temperatures, the $T_g$ of the blend is always higher than that of the component with the lower $T_g$. Here PVOH has a lower $T_g$ than pectin. In this case pectin, the component whose $T_g$ is above that of the blend, tends to immobilize the molecules of the PVOH, thereby effectively increasing the $T_g$ of that component.

As shown in FIG. 1, the molecular weight of the PVOH had a small but noticeable effect on the temperature of the glass transition in the blends and in films by itself. The relative values observed between the two molecular weights in the films fabricated from the blends and in the pure resin powders show the same trends. In both cases, measurements by differential scanning calorimetry (DSC) and dynamic mechanical analysis (DMA), the lower molecular weight samples had the higher $T_g$ values, even if by only a few degrees. Degree of ester hydrolysis also had little effect on the $T_g$ in the blends. There appeared to be a very slight increase in $T_g$ with decreasing degree of ester hydrolysis (increased ester content). The increase in $T_g$ became less evident as the proportion of PVOH in the blend decreased, and the differences were small enough that they were within the variability of the measurements.

Of more practical significance from an end use perspective are the values for the storage E' and loss E" moduli for the different blends at various temperatures. Essentially there were no differences in blend moduli between the two different molecular weights for any of the three degrees of hydrolysis. Nor were the modulus values different between the two different molecular weight samples of the pure PVOH for any of the individual degrees of ester hydrolysis. However, the behavior of the storage E' and loss E" modulus for the samples with the 87–89% degree of hydrolysis were quite different than that of the polymers that were more fully hydrolyzed. Above $T_g$, both the E' and E" of these two PVOH samples were about one third of the values observed with the more fully hydrolyzed materials. This larger decrease in modulus above $T_g$ did not seem to have much of an effect on the modulus values observed on the blends with pectin.

These lower modulus materials are believed to have had a small effect on the modulus values of the blends because the observed moduli in the films are a composition weighted arithmetic average of the moduli of the two individual components. Since the modulus for the pectin is so much higher than that of either of the PVOH samples above $T_g$, even relatively large changes in the modulus of the PVOH will have only a small effect on the arithmetic average modulus of the blend when one is replaced by the other, except for blends which contain very little pectin. Only at this extreme does the PVOH have a modulus comparable to that of the blend.

In the blends containing 50% PVOH there was a small rise in the value of the E' above about 70° C. followed by a small decline past about 130° C. This indicates that some shrinkage and stiffening occurs in the film, followed by additional softening of the film at still higher temperatures. This phenomenon is attributable to the PVOH since this behavior is not observed in the pectin alone. This behavior occurs in plasticized blends of pectin and starch also (Coffin and Fishman. 1994. *J. App. Polym. Sci.* vol. 54, pp. 1311–1320, herein incorporated by reference). The PVOH chains are more mobile that unplasticized pectin chains, thereby allowing molecular rearrangement to occur more easily.

Platicization of a 70/30 blend of pectin and PVOH with glycerol increases chain mobility as the glycerol content is increased. Thus the $T_g$ of the PVOH is depressed until it merges into the $T_g$ of the pectin which has been induced by the addition of the glycerol.

Thus, the addition of PVOH of different molecular weights and different degrees of ester hydrolysis into blends with high methoxy pectin imparted a glass transition into the blend. The temperature of this transition decreased as the amount of PVOH in the blend was increased, but was relatively insensitive to the type of PVOH used. The $T_g$ ranged from about 5° C. to 45° C. depending on the composition. Below the $T_g$, E' and E" of the blends were insensitive to both the PVOH type and the amount of PVOH present in the blend. Above the $T_g$ there was little or no effect of the PVOH type on the modulus values of the blends. The PVOH samples themselves showed no effect of molecular weight on either of the two moduli, however, the values for both polymers with the lowest degree of ester hydrolysis were about one third of the values of the other four materials. This difference did not show up in the blended films because the moduli for the PVOH samples above $T_g$ were all so much lower than the values from the pectin.

The addition of glycerol plasticizer to the blends depressed the $T_g$ of the PVOH, increased the molecular mobility of both the pectin and the PVOH, and allowed for noticeable shrinkage through molecular rearrangement to occur with enhanced packing efficiency of the molecules.

The following examples are intended only to further illustrate the invention and are not intended to limit the scope of the invention as defined by the claims.

EXAMPLES

Experiments were carried out to determine the effects of molecular weight and degree of ester hydrolysis on $T_g$ and ultimately on storage and loss moduli of films prepared from pectin and PVOH blends. MexPec 1400, a citrus pectin with a degree of methyl esterification of 71% and having high molecular weight, large radius of gyration and high intrinsic viscosity was used (Grindsted Products, Inc, Kansas City, Kans.). Six different grades of PVOH (Aldrich Chemical Co.) were used: three at a molecular weight range of 124,000–186,000 and having degrees of ester hydrolysis of 99+%, 98–99% and 87–89%, two at a molecular weight range of 31,000–50,000 and having degrees of ester hydrolysis of 98–99% and 87–89% and one at a molecular weight of 50,000 and having a degree of ester hydrolysis of 99+% (see Table I).

Stock solutions of PVOH with a concentration of 10.0% by weight were made by dissolving the polymers in water using the method recommended by Air Products Co. (Air Products, AIRVOL® Polyvinyl Alcohol product brochure, Allentown, Pa. 1993, herein incorporated by reference). This involved dispersing the polymer in cold water and then heating the dispersion with vigorous agitation at 85°, 93° or 95° C. for thirty minutes depending on the degree of ester hydrolysis. The temperature required increased with increasing degree of ester hydrolysis and attaining the minimum temperature specified was essential for complete dissolution of the polymers. No changes in degree of hydrolysis occurred during heating, and the samples maintained solubility after cooling. The solutions were stored in a refrigerator prior to use to avoid bacterial contamination.

The pectin/PVOH solutions were prepared by weighing the appropriate amount of the PVOH solution into a 50-ml beaker, adding sufficient water (HPLC grade made from deionized water using a Modulab Polisher I water system, Continental Water Systems, Inc.) to give a total solution weight of 37.5 g, and then adding the desired amount of pectin with stirring. For those samples where glycerol (99+ %, reagent grade, Aldrich Chemical Col.) was used as plasticizer, it was added to the water/PVOH mixture prior to the addition of pectin. In each sample the total weight of pectin plus PVOH plus glycerol was equal to 2.5 g. The samples were mixed until there was no evidence of undissolved solids, approximately two to three hours.

Six samples of PVOH were blended with the pectin (see Table I). Blends of the pectin were made with each polymer which contained 10, 30 and 50% by weight PVOH. Films made from these blends, as well as films made from each individual PVOH and the pectin by themselves, were analyzed by dynamic mechanical analysis (DMA) to determine the size and temperature of the thermal transitions present. Pure PVOH films as well as pectin/PVOH blends were also analyzed by differential scanning calorimetry (DSC) to further characterize the transitions.

Films were prepared by dissolving pectin in solution of PVOH at the particular dilution required and casting them on Lexan® plates using a Microm film Applicator (Paul N. Gardner Co., Pompano Beach, Fla.). A wet film thickness of 98 mils (2.5 mm) was used. The films were allowed to air dry overnight. After air-drying, the samples were vacuum-dried for 30 min at room temperature. The films were removed from the coating plates with a razor blade. Prior to testing the samples were stored in a dessicator with a relative humidity of 50% maintained by a saturated solution of sodium bisulfate.

TABLE I

| Sample | Molecular Weight × $10^{-2}$ | % Ester Hydrolysis |
|---|---|---|
| 1 | 31–50 | 87–89 |
| 2 | 31–50 | 98–99 |
| 3 | 50 | 99 |
| 4 | 124–186 | 87–89 |
| 5 | 124–186 | 98–99 |
| 6 | 124–186 | 99+ |

EXAMPLE II

Differential Scanning Calorimetry

Differential scanning calorimetry (DSC) runs were made using a Perkin-Elmer DSC 7 instrument equipped with a chiller for operation at sub-ambient temperatures. Approximately 20 mg samples were weighed into Perkin-Elmer large volume stainless steel DSC pans capable of withstanding internal pressure of 350 psi. Circular film samples that fit into the pans were cut out using a cork borer. All runs were made with an empty pan in the reference sample holder, and the instrument was placed in a nitrogen glove box. The samples were loaded into the instrument at 25° C., and the temperature was then lowered to −40° C. After stabilizing at this temperature, the samples were held for an additional two minutes, and were then heated from −40° to 100° C. at 10 ° C/min.

Figure 2:
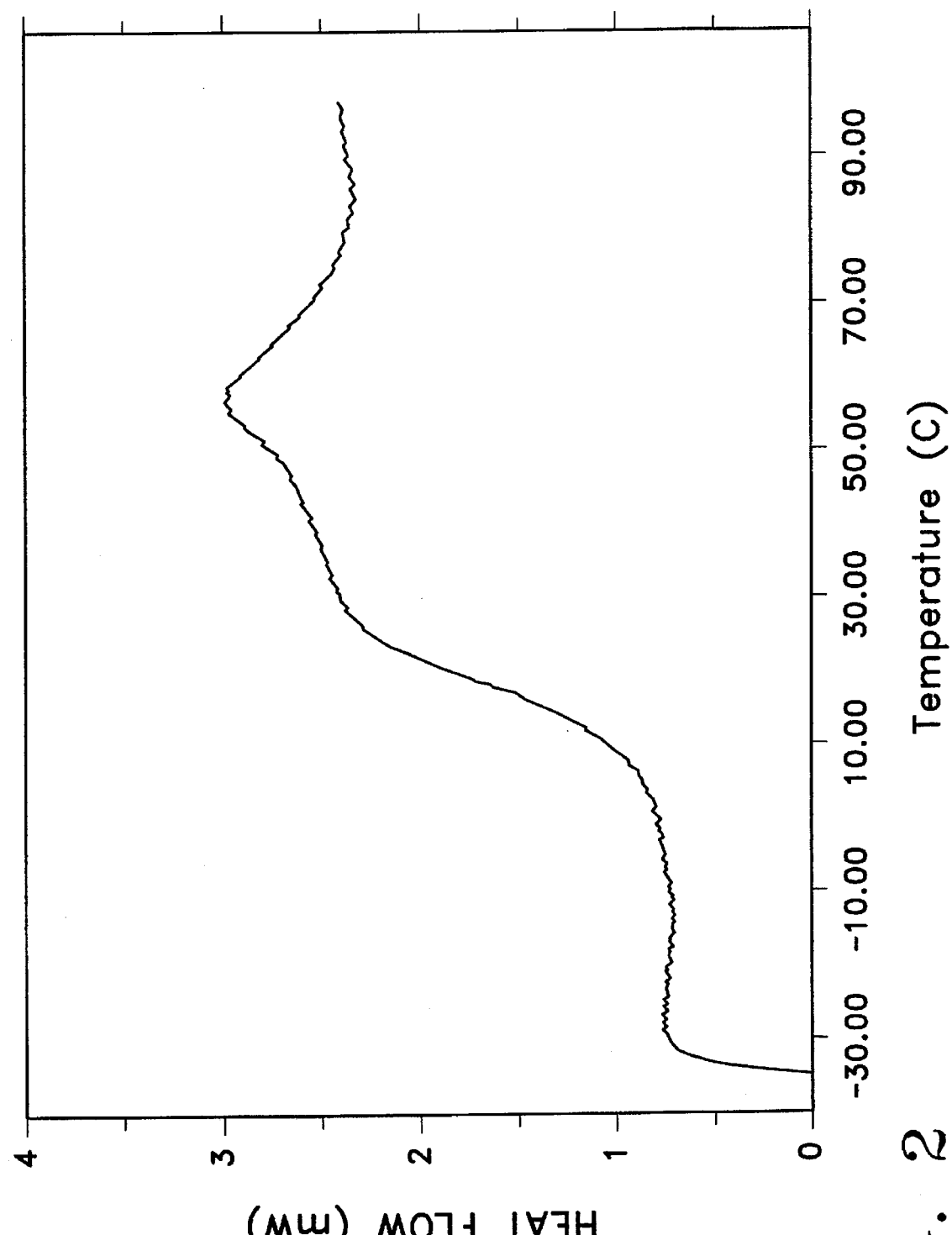
FIG. 2 is a differential scanning calorimetry (DSC) thermogram of poly(vinyl alcohol) of 124,000–186,000 molecular weight and 98–99% degree of ester hydrolysis.

Cast films of all six PVOH samples showed two broad overlapping thermal transitions. A typical scan is shown in FIG. 2. The first transitions occurred at 19°–23° C. for the 50,000 molecular weight samples, and at 20°–27° C. for the 124,000–186,000 molecular weight samples. The higher temperature transition occurred at 63° –66° C. for the 50,000 molecular weight samples, and at 57°–60° C. for the 124, 000–186,000 molecular weight samples. For the 50,000 molecular weight samples, the lower temperature transition was about 5°–7° C. lower than for the 124,000–186,000 samples, whereas they were 6°–8° C. higher at the upper temperature transition. The areas of the individual peaks could not be resolved. The total area of the two peaks averaged 16.5 J/g for the 124,000–186,000 molecular weight samples, and about 18.1 J/g for the 50,000 molecular weight samples. Unlike molecular weight, degree of residual esterification had little or no effect on the thermal behavior of PVOH.

DSC curves of the PVOH powders with a degree of ester hydrolysis of 98–99% showed a single peak at 56° C. and 54° C respectively for the 50,000 and 124,000 molecular weight materials. Thus the higher temperature peak in the DSC curves of the films corresponds to the PVOH glass transition temperature. These relative values are consistent with those found in the films. The $T_g$ of PVOH has been reported to be 85° C. (Brandrup and Immergut, 1975. *Polymer Handbook*, Wiley Interscience, New York. pp. III–150, herein incorporated by reference). The lower temperature peak in the DSC curves apparently corresponds to some other second order transition caused during the preparation of the films.

No thermal transitions were noted in the pure pectin film up to a temperature of 200° C. Pectin does not have a glass transition temperature or melting point in the temperature range studied.

EXAMPLE III

Mechanical Testing

Dynamic mechanical analysis (DMA) was done on a Theometrics RSA II solids analyzed (Piscataway, N.J.) using a film-testing fixture. Liquid nitrogen was used for cooling to sub-ambient temperatures. Test samples were cut from the films with a razor blade. Nominal dimensions of the samples were 6.9 mm×0.08 mm. Sample thickness was measured with a micrometer, and sample width was measured with a millimeter ruler. The gap between the jaws at the beginning of each test was 23.0 mm.

A nominal strain of 0.1% was used in all cases, with an applied frequency of 10 rad/sec (1.59 Hz). Storage modulus (E'), loss modulus (E') and loss tangent (tan δ) were determined as a function of temperature. Data were taken from −100° C. to 200° C using a heating rate of 10° C/min. One data point was taken every 24 s. Data analysis was carried out using the Rheometrics RHIOS software.

All of the blends showed a distinct $T_g$ attributable to the PVOH. The size of the transition was proportional to the amount of PVOH in the blend. The general features of the thermograms were similar for both molecular weights and for all three degree of ester hydrolysis. This is shown for the E' and E" of a typical set of compositions for a 50,000 molecular weight sample in FIG. 3 and for a 124,000–186,000 molecular weight sample in FIG. 4.

Figure 5:
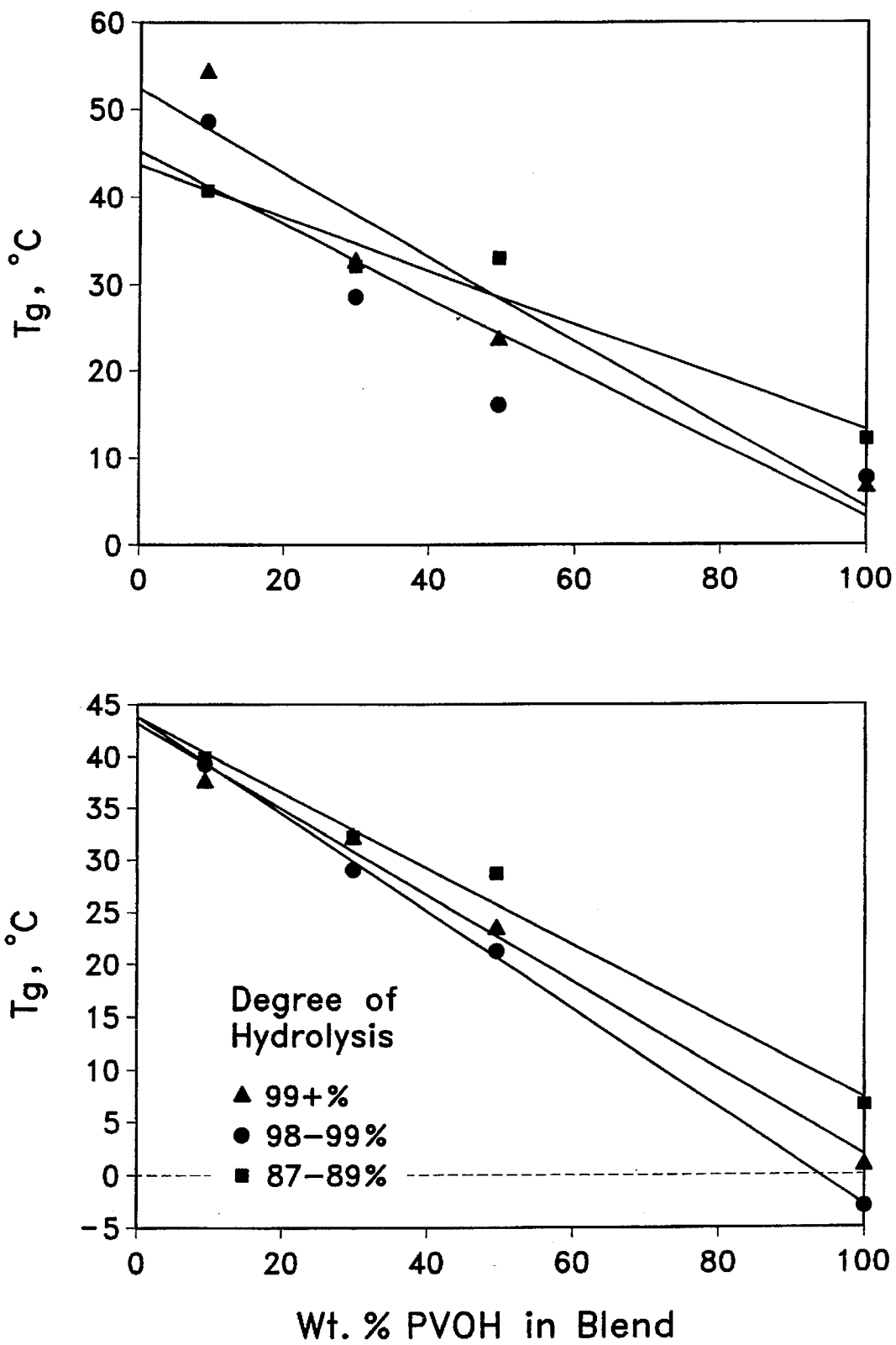
FIGS. 5 top and 5 bottom show the effect of PVOH content on glass transition temperature at molecular weights of 124,000–186,000 (Panel A) and 50,000 (Panel B).

If the blended film is considered to be a pectin film modified by PVOH, the temperature at which the glass transition of the blend occurred was found to decrease as the amount of PVOH in the blend increased. Alternatively, if the blend is considered to be a PVOH film modified by pectin, then the addition of pectin to the PVOH resulted in an increase in the $T_g$ of PVOH. FIG. 5 shows the effect of film composition on the $T_g$ of the pectin/PVOH blends. In general, the glass transition temperature of PVOH in the blended films was found to be near 45° C. when it was present at the 10% level by weight in the pectin. By way of contrast, the $T_g$ was about 5° C. in the pure PVOH films when the location of the $T_g$ was marked by the location of the peak in the E" curve. The change was essentially linear with changes in composition. Correlation coefficients of greater than 0.95 were found in all cases. Using the peak in the tan δ plot to determine the $T_g$ consistently gave values 5°–10° C. higher. (Tan δ E" /E' represents the relative contribution of the elastic E" and the Viscous E" components of the complex modulus in the material properties.) This increase in the $T_g$ of the PVOH with increasing amounts of the pectin, which shows no glass transition over the wide temperature range investigated, is expected behavior for glassy polymer mixtures.

The effect of the degree of hydrolysis on the $T_g$ of the blends for the different compositions is shown in FIG. 1. There appears to be little change with degree of hydrolysis, although there does seem to be a very slight upward trend with increasing ester content. This small change with ester content is less marked in the samples containing only 10% PVOH, but this is to be expected since the low level of the PVOH makes the exact temperature of the transition somewhat more difficult to determine. No strong trend was noted with the effect of molecular weight. Although the glass transitions seen in the pure PVOH samples are definitely higher for the higher molecular weight samples, no real difference was seen between the $T_g$s observed for the different molecular weight polymers in the blends with pectin. The variability of the $T_g$ values when measured by the DSC method was 2°–6° C. A similar variability was found by DMA.

Figure 3:
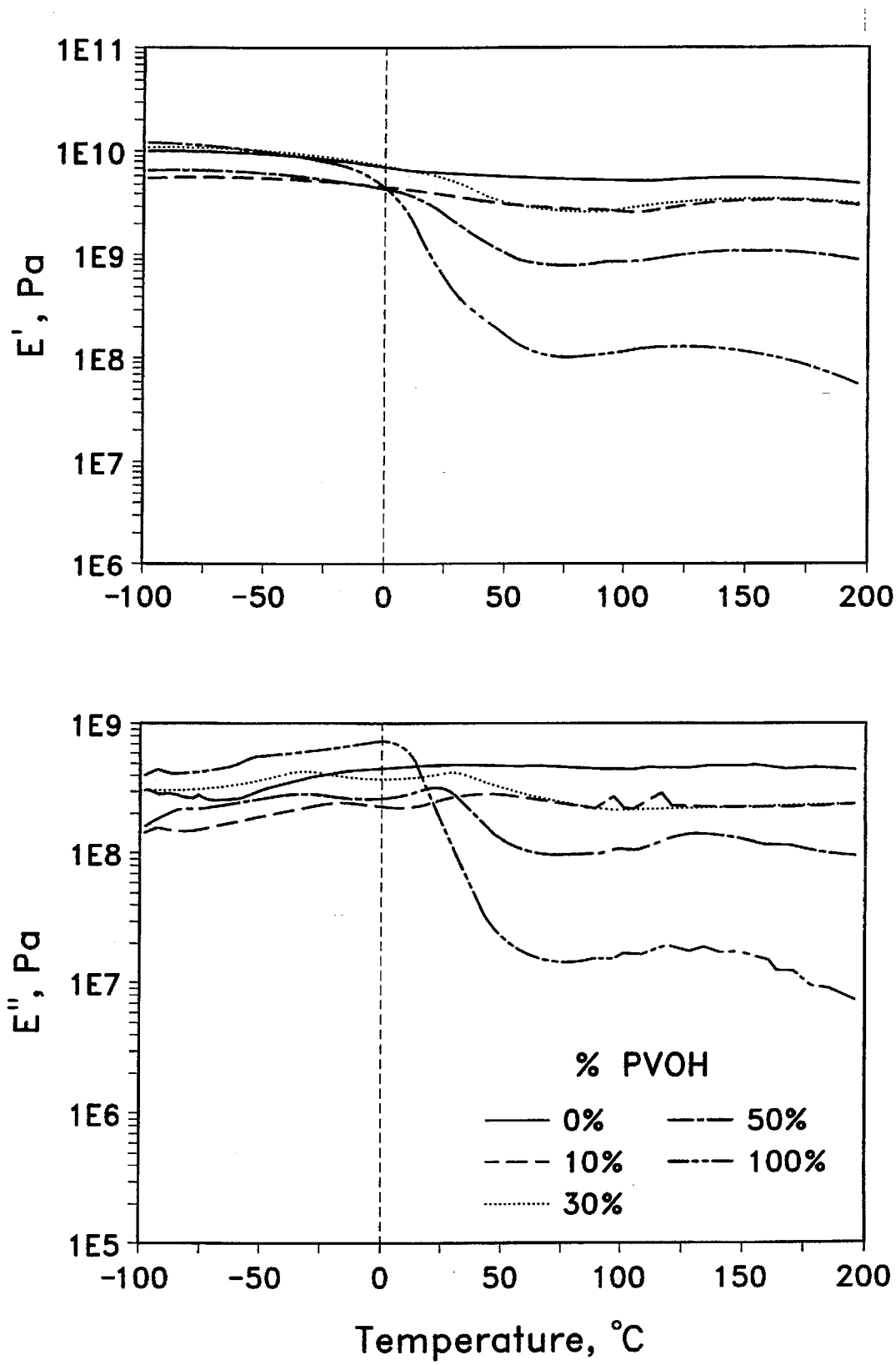
FIGS. 3E' and 3E" show the effect of PVOH content on storage modulus E' (Panel A) and loss modulus E" (Panel B) of films containing pectin and PVOH with 50,000 mol. wt. and 99+% degree of hydrolysis.
Figure 4:
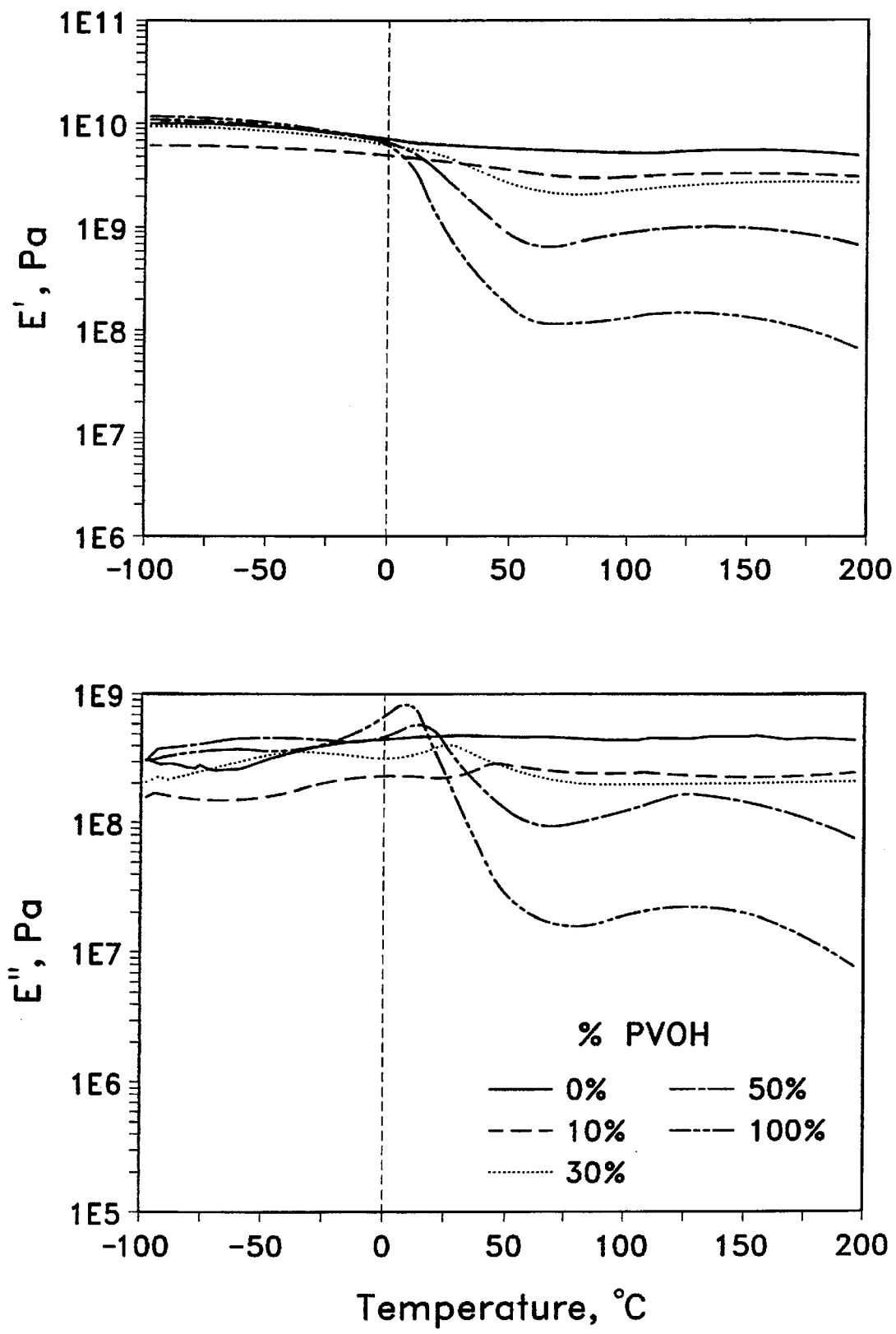
FIGS. 4E' and 4E" show the effect of PVOH content on the storage modulus E' (Panel A) and loss modulus E" (Panel B) of films containing pectin and PVOH with 124,000–186,000 molecular weight and 99+% degree of hydrolysis.

The storage modulus E' is a measure of the elastic properties of the films (Ferry, J.D. 1961. *Viscoelastic properties of Polymers*, Wiley, New York. p. 30, herein incorporated by reference). Below the $T_g$, all of the films had a relatively constant value for E' in the range of 0.5×10¹⁰ Pa. Above the $T_g$, E' decreased by about one to one and a half orders of magnitude over the next 50° C. above $T_g$ as the PVOH content was increased from 0 to 50% by weight. It then plateaued as can be seen in FIGS. 3 and 4. The drop in storage modulus above $T_g$ is relatively proportional to the amount of PVOH present in the blend. A similar behavior pattern was observed for the loss modulus E" , where the modulus exhibited a large drop following the $T_g$ peak. Reproducibility of the modulus values was found to be ±15%.

There was very little difference in the temperature behavior of the two moduli with molecular weight. Curves for the blends containing the different molecular weight PVOH's were essentially superimposable over the entire temperature range for all compositions, including the pure PVOH samples. However, there was a very noticeable change seen with differences in the degree of ester hydrolysis of the samples.

Figure 6:
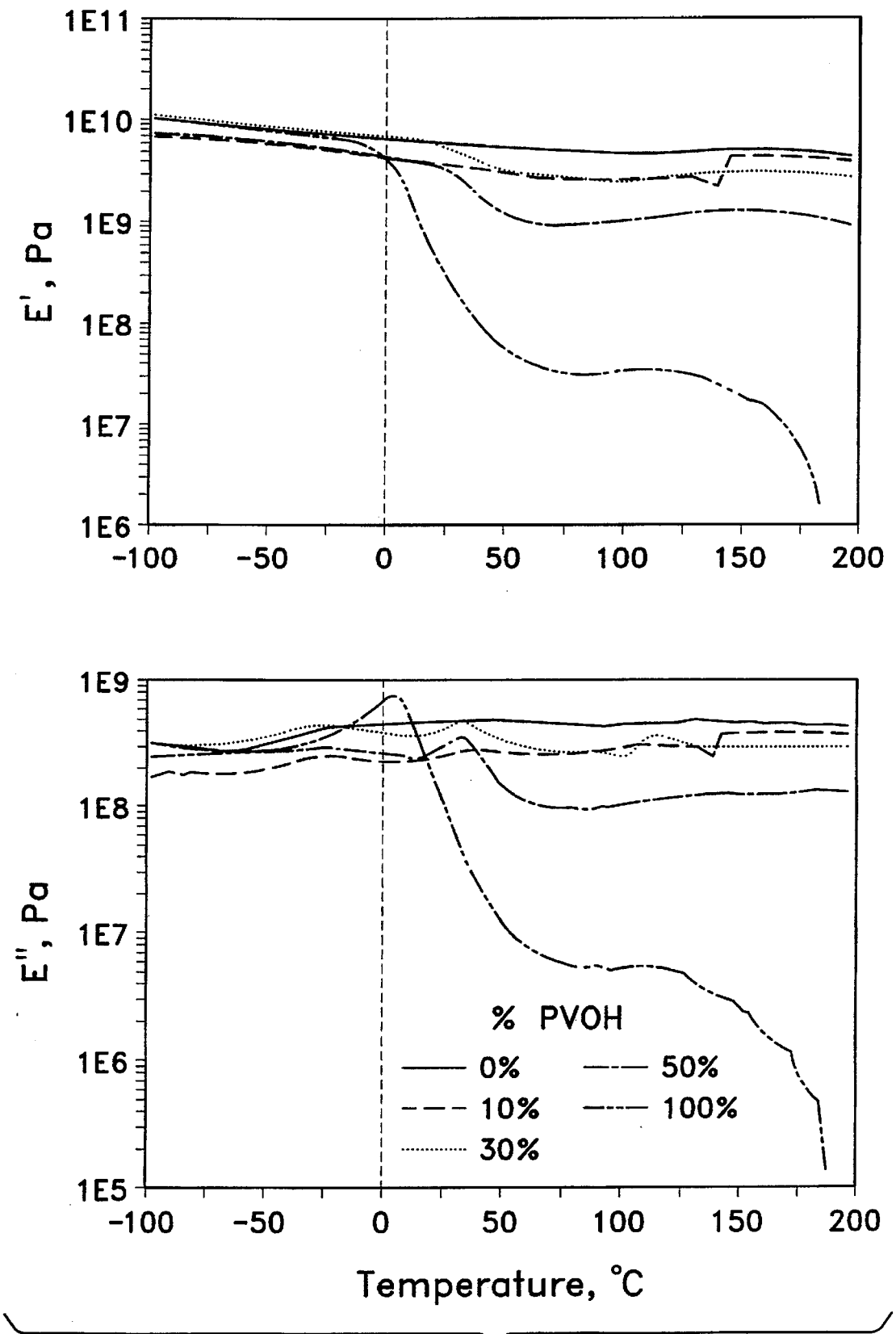
FIGS. 6E' and 6E" show the effect of PVOH content on the storage modulus E' (Panel A) and loss modulus E" (Panel B) of films containing pectin and PVOH with 50,000 molecular weight and 87–89% degree of hydrolysis.

For both molecular weights, samples with 98% or higher degree of ester hydrolysis exhibited essentially identical behavior. Samples made using the PVOH with 87–89% hydrolysis, however, behaved quite differently from those more highly hydrolyzed. Nevertheless, in those samples there was no difference due to molecular weight. For both of these polymers, the plateau values of the two moduli above $T_g$ were significantly lower than for the other PVOH samples. This difference was also very visible in the 50% blends, but was difficult to see in the blends containing lower levels of the PVOH. The loss and storage modulus data for the samples containing various amounts of the 50,000 molecular weight PVOH with 87–89% hydrolysis are shown in FIG. 6.

Figure 7:
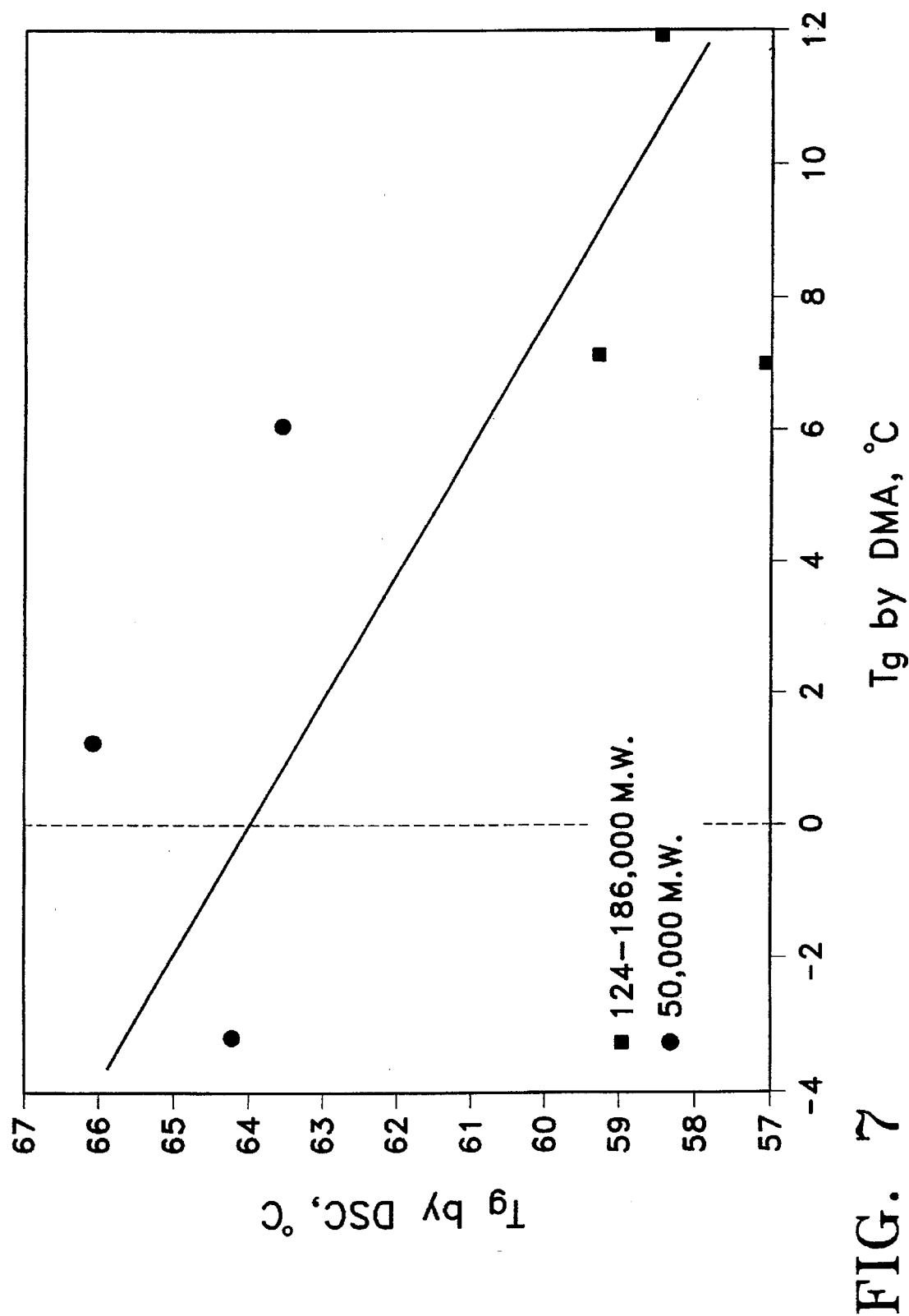
FIG. 7 shows glass transition temperature $T_g$ as determined by dynamic mechanical analysis (DMA) as compared to that determined by differential scanning calorimetry (DSC).
Figure 8:
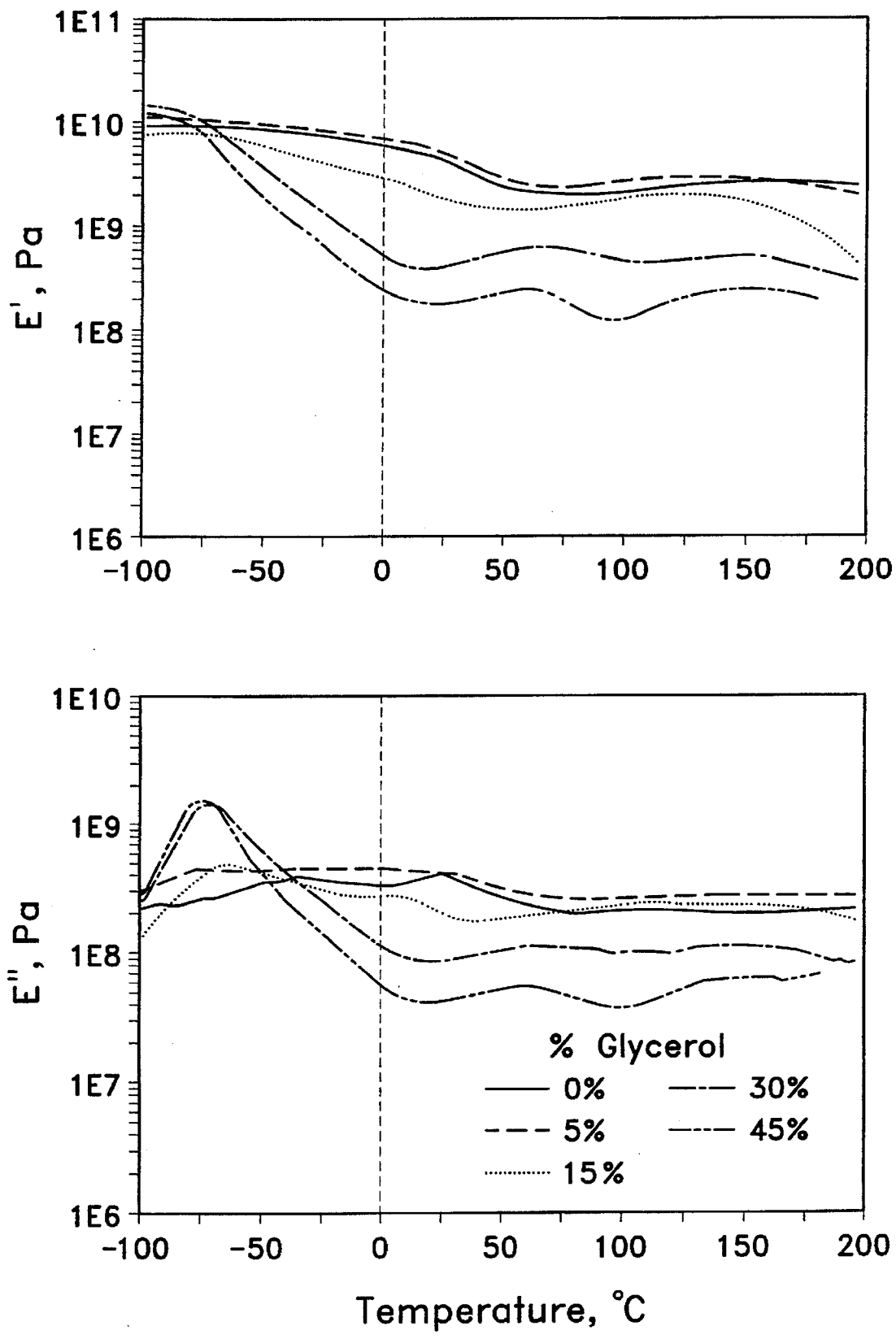
FIGS. 8E' and 8E" show the effect of glycerol content on the storage modulus E' (Panel A) and loss modulus E" (panel B) of pectin/PVOH blend containing 30% PVOH with 124,000–186,000 molecular weight and 99+% degree of ester hydrolysis.

There was a substantial difference between the $T_g$s determined by DSC and those found using DMA. This apparent discrepancy can be explained by the difference in the properties measured by the two methods. DSC measures the heat taken up as the polymer changes from the glassy to the rubbery state. DMA, on the other hand, measures the dynamic stiffness of the sample. It is quite normal for the storage modulus of a material to begin a rapid decrease prior to the actual $T_g$ as increased molecular motion begins to occur in the polymer chains. A linear correlation ($r^2$=0.55) was found between the $T_g$ values found by DSC and those found by DMA, as seen in FIG. 7. FIG. 8 shows the plasticizing effect of glycerol on a 70/30 pectin PVOH blend containing the higher molecular weight PVOH with the highest degree of ester hydrolysis. The addition of glycerol had a large effect on both E' and E" behavior of this polymer blend, particularly with 15% or more glycerol. The addition of 5% glycerol had little effect on the storage modulus curve, but appeared to decrease the magnitude of the $T_g$ peak in the loss modulus curve somewhat. With 15% glycerol, the $T_g$ peak was found to decrease in temperature by about 20° C., and a new peak appeared which was due to the interaction of the glycerol with the pectin (described in Coffin and Fishman, *supra*). At higher glycerol levels (30 and 45%), the glass transition of the PVOH seemed to disappear, and new peaks appeared above 60° C., indicating the presence of new thermal transitions. These are probably a result of film shrinkage. In addition, both E' and E" of blends containing 30 and 45% glycerol were much lower than those for the blends containing lower amounts of glycerol at temperatures above about −60° C. At temperatures below about −80° C., all of the blends had close to the same storage modulus values.

In the DMA experiments, the presence of glass transitions was noted by large and fairly sharp changes in the mechanical properties of the films with temperature. A glass transition shows up in the E' curve as a rapid drop in the modulus. In the E" and tan δ curves, the transitions show up as a peak. Shrinkage induced by rearrangement of the polymer molecules may show up as a gradual increase in E' with increasing temperature, or as a peak in both the E' and E" curves.

We claim:

1. A film consisting essentially of a blend of pectin and poly(vinyl alcohol) in amounts effective for the formation of a film.

2. The film of claim 1, wherein said pectin has a high molecular weight, large radius of gyration, high degree of methyl esterification and high intrinsic viscosity at an ionic strength of at least 0.05.

3. The film of claim 2, wherein said molecular weight is at least about 100,000, said radius of gyration is at least about 25 nanometers, said degree of methyl esterification is at least about 50%, and said intrinsic viscosity is at least about 2.1 dl/g.

4. The film of claim 1, wherein said poly(vinyl alcohol) is present in an amount ranging from about 10% (w/v) to about 90% (w/v).

5. The film of claim 4, wherein said poly(vinyl alcohol) is resent in an amount ranging from about 20% (w/v) to about 80% (w/v).

6. The film of claim 1, wherein said blend further comprises an effective amount of plasticizer.

7. The film of claim 6, wherein said plasticizer is selected from the group consisting of glycerol, poly(alkylene glycols), urea, glycerine.

8. The film of claim 6, where the plasticizer is glycerol.

9. A method of making a film, said method comprising a) dissolving poly(vinyl alcohol) in an aqueous medium at a temperature sufficient to dissolve said poly(vinyl alcohol), b) adding an effective amount of pectin to the poly(vinyl alcohol) solution to form a pectin/poly(vinyl alcohol) blend, c) casting the blend on a plate, such that a film is formed, d) allowing the film to dry, and e) removing the film from the plate.

10. The method of claim 9, said method further comprising adding an effective amount of plasticizer to the poly (vinyl alcohol) solution of step a).

\* \* \* \* \*